US012123977B2

(12) United States Patent
Liu et al.

(10) Patent No.: US 12,123,977 B2
(45) Date of Patent: Oct. 22, 2024

(54) LIDAR DEVICE (71) Applicant: SUTENG INNOVATION TECHNOLOGY CO., LTD., Shenzhen (CN)

(72) Inventors: Bo Liu, Shenzhen (CN); Jianming Xiong, Shenzhen (CN); Gaoshan Ye, Shenzhen (CN)

(73) Assignee: SUTENG INNOVATION TECHNOLOGY CO., LTD., Shenzhen (CN)

( * ) Notice: Subject to any disclaimer, the term of this patent is extended or adjusted under 35 U.S.C. 154(b) by 875 days.

(21) Appl. No.: 17/220,004

(22) Filed: Apr. 1, 2021

(65) Prior Publication Data
US 2021/0215804 A1    Jul. 15, 2021

Related U.S. Application Data (63) Continuation of application No. PCT/CN2020/084993, filed on Apr. 15, 2020.

(30) Foreign Application Priority Data

Apr. 15, 2019   (WO) ............... PCT/CN2019/082736
Jan. 3, 2020    (WO) ............... PCT/CN2020/070345

(51) Int. Cl.
*G01S 7/481*     (2006.01)
*G01S 17/931*    (2020.01)
(52) U.S. Cl.
CPC .......... *G01S 7/4817* (2013.01); *G01S 7/4813* (2013.01); *G01S 17/931* (2020.01)

(58) Field of Classification Search
CPC .... G01S 7/4817; G01S 7/4813; G01S 17/931; G01S 17/02
See application file for complete search history.

(56) References Cited

U.S. PATENT DOCUMENTS

| 2009/0002678 A1* | 1/2009 | Tanaka ................. G02B 5/09 |
| | | 356/4.01 |
| 2016/0187131 A1* | 6/2016 | Chang .................. G02B 23/14 |
| | | 356/4.01 |
| 2017/0219695 A1 | 8/2017 | Hall et al. |
| 2018/0372853 A1 | 12/2018 | Droz et al. |

FOREIGN PATENT DOCUMENTS

| CN | 101639338 A | 2/2010 |
| CN | 101688774 A | 3/2010 |
| CN | 103235316 A | 8/2013 |
| CN | 105510926 A | 4/2016 |

(Continued)

OTHER PUBLICATIONS

International Search Report of PCT/CN2020/084993 (Jun. 30, 2020).

(Continued)

*Primary Examiner* — Michael C Zarroli
(74) *Attorney, Agent, or Firm* — BAYES PLLC (57) ABSTRACT This application provides a sensor, including a rotating component rotatably mounted to a base and configured to rotate about a central shaft and an optical component mounted on the rotating component. The optical component has an optical axis that is oblique with respect to the central shaft.

16 Claims, 6 Drawing Sheets (56) References Cited

FOREIGN PATENT DOCUMENTS

| | | |
|---|---|---|
| CN | 205899006 U | 1/2017 |
| CN | 108363071 A | 8/2018 |
| CN | 108398696 A | 8/2018 |
| CN | 108474654 A | 8/2018 |
| CN | 108957424 A | 12/2018 |
| CN | 208239615 U | 12/2018 |
| DE | 102004040363 A1 | 3/2006 |
| WO | 2017193269 A1 | 11/2017 |

OTHER PUBLICATIONS

International Search Report of PCT/CN2019/082736 (Dec. 30, 2019).
International Search Report of PCT/CN2020/070345 (Apr. 1, 2020).

* cited by examiner

LIDAR DEVICE

RELATED APPLICATIONS

The present patent document is a bypass continuation of International Patent Application No. PCT/CN2020/084993, filed Apr. 15, 2020, which claims the benefit of priority to International Patent Application No. PCT/CN2019/082736, filed Apr. 15, 2019, and International Patent Application No. PCT/CN2020/070345, filed Jan. 3, 2020, which further claims the benefit of priority to International Patent Application No. PCT/CN2019/082736, filed Apr. 15, 2019, the entire contents of each of which are incorporated herein by reference.

BACKGROUND

1. Technical Field Text

This application is related to laser sensing in general and to a Lidar device in particular.

2. Background Information

Lidar is a radar system that emits laser beams to detect position, velocity, or other characteristics of an object in a detection region. In particular, a Lidar may have a light transmitting system configured to generate and output an outgoing light signal (e.g., a laser signal) to the detection region for detecting the object, and a light receiving system configured to receive a reflected light signal from the object in the detection region. The reflected light signal is compared with the outgoing light signal. Based on the comparison, relevant information or characteristics of the object can be obtained, such as distance, orientation, height, speed, attitude, shape, etc.

At present, mechanical rotary Lidars have been widely used because of its technical maturity. Generally, a mechanical rotary Lidar uses a transmitting system and a receiving system arranged horizontally. The Lidar is rotated horizontally to achieve scanning in the horizontal direction.

However, in some applications, such as autonomous vehicle, in addition to scanning in the lateral directions of the vehicle, it is also necessary to extend the vertical field of view downward to scan road conditions, such as ground pits, and/or upward to scan the sky. Therefore, there is a need for Lidars with a wider field of view.

BRIEF SUMMARY

According to one embodiment of the present disclosure, a sensor is provided.

According to an aspect of the present disclosure, a sensor may comprises a rotating component rotatably mounted to a base and configured to rotate about a central shaft; and an optical component mounted on the rotating component. The optical component may have an optical axis that is oblique with respect to the central shaft.

The optical axis and the central shaft may form an acute angle. The sensor may have a field of view that covers a direction along the central shaft and a direction perpendicular to the central shaft. The field of view may be equal to 90 degrees.

The sensor may further comprise a housing and a cover coupled to form a seal cavity for housing the rotating component and the optical component. The cover may have a dome shape.

The sensor may have a field of view that covers a direction along the central shaft and a direction perpendicular to the central shaft. The field of view may be equal to 90 degrees.

The optical component may include a transmitting system configured to generate and transmit an outgoing light signal to a detection region; and a receiving system configured to receive a reflected light signal from the detection region. The reflected light signal may include a portion of the outgoing light signal reflected from the detection region.

The transmitting system may further include a transmitting lens barrel and a transmitting lens group. The transmitting lens barrel may have a first aperture at a first end and a second aperture at a second end, the first aperture being smaller than the second aperture. The transmitting lens group may be disposed in the transmitting lens barrel. The transmitting lens group may have a first transmitting lens having a first diameter and disposed at the first end of the transmitting lens barrel and a second transmitting lens having a second diameter and disposed at the second end of the transmitting lens barrel, the first diameter being smaller than the second diameter.

The transmitting system may further include one or more transmitters configured to generate the outgoing light signal. The transmitting lens group may receive the outgoing light signal through the second transmitting lens from the one or more transmitters, and transmit the outgoing signal through the first transmitting lens to the detection region. The transmitting lens group may further include a third transmitting lens having a third diameter and disposed in the transmitting lens barrel between the first end and the second end, the third diameter being greater than the first diameter of the first transmitting lens and smaller than the second diameter of the second transmitting lens. The transmitting lens group may further include a fourth transmitting lens having a fourth diameter and disposed in the transmitting lens barrel between the third transmitting lens and the second transmitting lens, the fourth diameter being greater than the third diameter of the third transmitting lens and smaller than the second diameter of the second transmitting lens.

Each of the second transmitting lens and the fourth transmitting lens may have a refractive index between 1.8 and 2.2. The first transmitting lens may have a first diopter, the second transmitting lens may have a second diopter, the third transmitting lens may have a third diopter, and the fourth transmitting lens may have a fourth diopter. The first, second, third, and fourth diopters may be configured according to one of the followings: (a) the first, second, and fourth diopters are positive, and the third diopter is negative; (b) the first and second diopters are positive, and the third and fourth diopters are negative; (c) the first and fourth diopters are positive, and the second and third diopters are negative; (d) the first and fourth diopters are negative, and the second and third diopters are positive; or (e) the first and second diopters are negative, and the third and fourth diopters are positive. The transmitting lens barrel may have a cone or pyramid shape.

The receiving system may include a receiving lens barrel and a receiving lens group. The receiving lens barrel may have a first aperture at a first end and a second aperture at a second end, the first aperture being smaller than the second aperture. The receiving lens group may be disposed in the receiving lens barrel. The receiving lens group may have a first receiving lens having a first diameter and disposed at the first end of the receiving lens barrel and a second receiving lens having a second diameter and disposed at the second end of the receiving lens barrel, the first diameter being smaller than the second diameter. The receiving system may further include a light receiver array configured to receive the reflected light signal from the receiving lens group. The receiving lens group may receive the reflected light signal through the first receiving lens from the detection region and transmit the reflected light signal through the second receiving lens to the light receiver array.

The receiving lens group may further include a third receiving lens having a third diameter and disposed in the receiving lens barrel between the first end and the second end, the third diameter being greater than the first diameter of the first receiving lens and smaller than the second diameter of the second receiving lens. The receiving lens group may further include a fourth receiving lens having a fourth diameter and disposed in the receiving lens barrel between the third lens and the second lens, the fourth diameter being greater than the third diameter of the third receiving lens and smaller than the second diameter of the second receiving lens.

Each of the second receiving lens and the fourth receiving lens may have a refractive index between 1.8 and 2.2. The first receiving lens may have a first diopter, the second receiving lens may have a second diopter, the third receiving lens may have a third diopter, and the fourth receiving lens may have a fourth diopter. The first, second, third, and fourth diopters may be configured according to one of the followings: (a) the first, second, and fourth diopters are positive, and the third diopter is negative; (b) the first and second diopters are positive, and the third and fourth diopters are negative; (c) the first and fourth diopters are positive, and the second and third diopters are negative; (d) the first and fourth diopters are negative, and the second and third diopters are positive; or (e) the first and second diopters are negative, and the third and fourth diopters are positive. The receiving lens barrel may be a cone or pyramid shape.

The rotating component may have a first side and a second side opposite to the first side. The optical sensor may be mounted to the first side of the rotating component. The optical component may be mounted to the first side of the rotating component, and the central shaft may be coupled to the second side of the rotating component and configured to drive the rotating component to rotate.

The rotating component may be coupled to a base through the central shaft. The transmitting system and the receiving system may be disposed on the rotating component. The rotating component drives the transmitting system and the receiving system to rotate.

The transmitting system may have a field of view of 90° along the central shaft. The field of view of the transmitting system may cover from 0° to 90°, wherein 0° corresponds to a direction along the central shaft and 90° corresponds to a direction perpendicular to the central shaft.

The transmitting system may have a transmitting axis and the receiving system may have a receiving axis. The optical axis of the optical component may be parallel to the transmitting axis and the receiving axis. The transmitting axis and the receiving axis each form a 45° angle with the central shaft.

The transmitting system may include a transmitting lens module and a transmitting device. The receiving system may include a receiving lens module and a receiving device. The transmitting lens module may have a transmitting lens group having a plurality of transmitting lenses arranged according to their sizes, the transmitting lens group receiving the outgoing laser signal from the transmitting device through the transmitting lens having the largest size and transmitting the outgoing laser signal to the detection area through the transmitting lens having the smallest size. The receiving lens module may have a receiving lens group having a plurality of receiving lenses arranged according to their sizes, the receiving lens group receiving the reflected laser signal from the detection area through the receiving lens having the smallest size and transmitting the reflected laser signal to the receiving device through the receiving lens having the largest size.

The transmitting lens module may include a transmitting lens barrel configured to house the transmitting lens group, the transmitting lens barrel being inclined with respect to the central shaft, and an aperture of an outgoing end of the transmitting lens barrel being smaller than an aperture of an incoming end of the transmitting lens barrel. The receiving lens module may include a receiving lens barrel configured to house the receiving lens group, the receiving lens barrel being included with respect to the central shaft, and an aperture of an incoming end of the receiving lens barrel being smaller than an aperture of an outgoing end of the receiving lens barrel.

Each of the transmitting lens group and the receiving lens group may have a first spherical lens having a positive diopter, a second spherical lens having a negative diopter, a third spherical lens having a positive diopter, and a fourth spherical lens having a positive diopter. The first spherical lens, the second spherical lens, the third spherical lens, and the fourth spherical lens may be arranged from the smallest to the largest and disposed in the transmitting lens barrel and the receiving lens barrel, respectively.

Alternatively, each of the transmitting lens group and the receiving lens group may have:
(a) a first spherical lens having a positive diopter, a second spherical lens having a negative diopter, a third spherical lens having a negative diopter, and a fourth spherical lens having a positive diopter; or
(b) a first spherical lens having a negative diopter, a second spherical lens having a positive diopter, a third spherical lens having a negative diopter, and a fourth spherical lens having a positive diopter; or
(c) a first spherical lens having a negative diopter, a second spherical lens having a positive diopter, a third spherical lens having a positive diopter, and a fourth spherical lens having a negative diopter; or
(d) a first spherical lens having a positive diopter, a second spherical lens having a negative diopter, a third spherical lens having a positive diopter, and a fourth spherical lens having a negative diopter.

The first spherical lens, the second spherical lens, the third spherical lens, and the fourth spherical lens may be arranged from the smallest to the largest and disposed in the transmitting lens barrel and the receiving lens barrel, respectively.

A diaphragm may be disposed between the first spherical lens and the second spherical lens of each of the transmitting lens group and the receiving lens group. A filter may be disposed on a side of the first spherical lens away from the second spherical lens. Each of the third spherical lens and the fourth spherical lens may have a refractive index between 1.8 and 1.9. Alternatively, each of the third spherical lens and the fourth spherical lens may have a refractive index between 1.9 and 2.2.

The transmitting lens module and the receiving lens module may be disposed side by side on the same side of the rotating component and are disposed symmetrically with respect to a plane passing the central shaft. The transmitting device may be disposed on the rotating component and configured to transmit the outgoing laser signal through the transmitting lens module. The transmitting device may include a substrate and a plurality of transmitters disposed on the substrate along a direction of the central shaft. Optical axes of adjacent transmitters may form an angle. The receiving device may be disposed on the rotating component, and the receiving lens module may transmit the reflected laser signal to the receiving device.

The sensor may further include a housing and a spherical cover, wherein the transmitting system, the receiving system, and the rotating component are disposed in a cavity formed by the base, the housing, and the spherical cover. The central shaft may be fixed to the base and rotatably coupled to the rotating component. Alternatively, the central shaft may be fixed to the rotating component and rotatably coupled to the base.

DETAILED DESCRIPTION OF THE DRAWINGS AND THE PRESENTLY PREFERRED EMBODIMENTS

In order to facilitate understanding of the present application, and in order to make the above-mentioned objects, features, and advantages of the present application more comprehensible, specific embodiments of the present application will be described in detail below with reference to the accompanying drawings. In the following description, many specific details are set forth in order to fully understand the present application, and the preferred embodiments of the present application are shown in the accompanying drawings. However, the present application can be implemented in many different forms and is not limited to the embodiments described herein. Rather, these embodiments are provided to provide a thorough understanding of the present disclosure. The present disclosure can be implemented in many other ways than described herein, and those skilled in the art can make similar improvements without departing from the content of the present application, so the present application is not limited by the specific embodiments disclosed below.

In addition, the terms "first" and "second" are used for descriptive purposes only and cannot be understood as indicating or implying relative importance or implicitly indicating the number of technical features. Therefore, the features defined as "first" and "second" may explicitly or implicitly include at least one of the features. In the description of the present disclosure, the meaning of "plurality" is at least two, for example, two, three, etc., unless it is specifically defined otherwise.

Unless defined otherwise, all technical and scientific terms used herein have the same meaning as commonly understood by one of ordinary skill in the art to which this disclosure belongs. The term "and/or" as used herein includes any and all combinations of one or more of the associated listed items.

Figure 1:
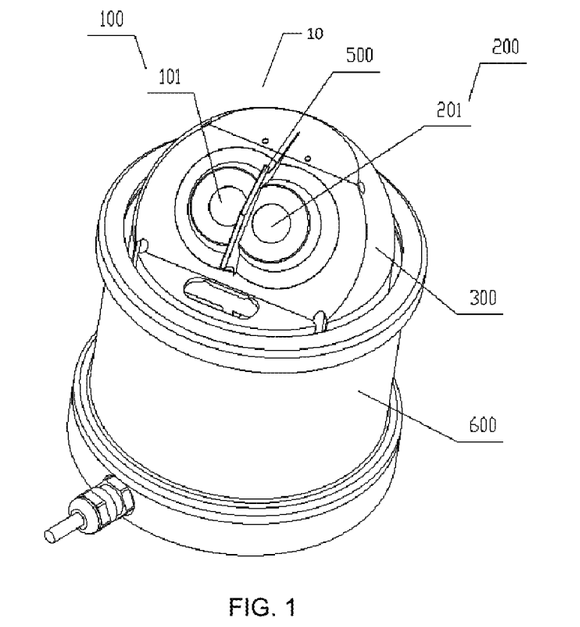
FIG. 1 is a perspective view of a Lidar device according to some embodiments of the present disclosure.
Figure 3:
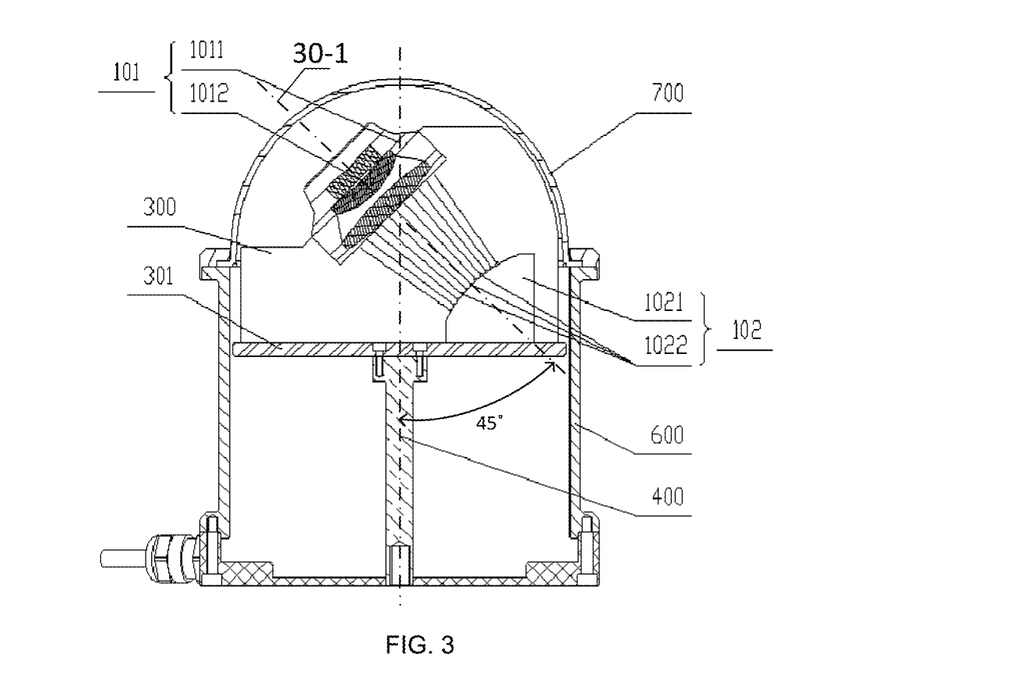
FIG. 3 is a lateral cross-sectional view of a Lidar device according to some embodiments of the present disclosure.

FIG. 1 shows a perspective view of a sensor such as a Lidar device 10 according to some embodiments of the present disclosure. FIG. 3 shows a cross-sectional view of the Lidar 10 of FIG. 1 according to some embodiments of the present disclosure. The Lidar device 10 may include a rotating component 300 and an optical component disposed on the rotating component. The optical component may include a transmitting system 100 and a receiving system 200.

The transmitting system 100 may be configured to emit an outgoing light signal, such as a laser signal, to a detection region. The detection region may have one or more objects that reflect at least a portion of the outgoing light signal. The reflected portion of the outgoing light signal may become a reflected light signal and return to the Lidar device 10. The receiving system 200 may be configured to receive the reflected light signal from the object in the detection region. The rotating component 300 may be driven by a vertical shaft 400 to rotate around a central axis of the vertical shaft 400. Since the transmitting system 100 and the receiving system 200 are disposed on and secured to the rotating component 300, they may rotate with the rotating component 300.

According to some embodiments, the transmitting system 100 may include a transmitting device 102 and a transmitting lens module 101. The transmitting device 102 may include one or more transmitters 1022 and a transmitting substrate 1021. The one or more transmitters 1022 may be arranged on the transmitting substrate 1021. The transmitters 1022 may be configured to emit the outgoing light signal directly towards the transmitting lens module 101 so that the outgoing light signal may be output through the transmitting lens module 101. The straight light path between the transmitters 1022 and the transmitting lens module 101 may improve the transmission efficiency of the transmitting system 100.

The receiving system 200 may include a receiving device and a receiving lens module 201. The receiving device may include one or more receivers and a receiving substrate. The one or more receivers may be arranged on the receiving substrate. The receiving lens module 201 may be aligned with the receiver and configured to direct and focus the reflected light signal directly onto the receivers. The direct light path between the receiving lens module 201 and the receivers may improve the receiving efficiency of the reflected light signal.

As shown in FIG. 3, according to some embodiments the rotating component 300 may include a supporting member 301. The supporting member 301 may be connected to the vertical shaft 400 through a connector. The vertical shaft 400 then may drive the rotating component 300 to rotate around a first axis. The transmitting system 100 and the receiving system 200 may be fixed to the supporting member 301 of the rotating component 300 and rotated with the rotating component 300. The first axis may be a central axis of the vertical shaft 400 and arranged vertically as shown in FIG. 3.

Figure 4:
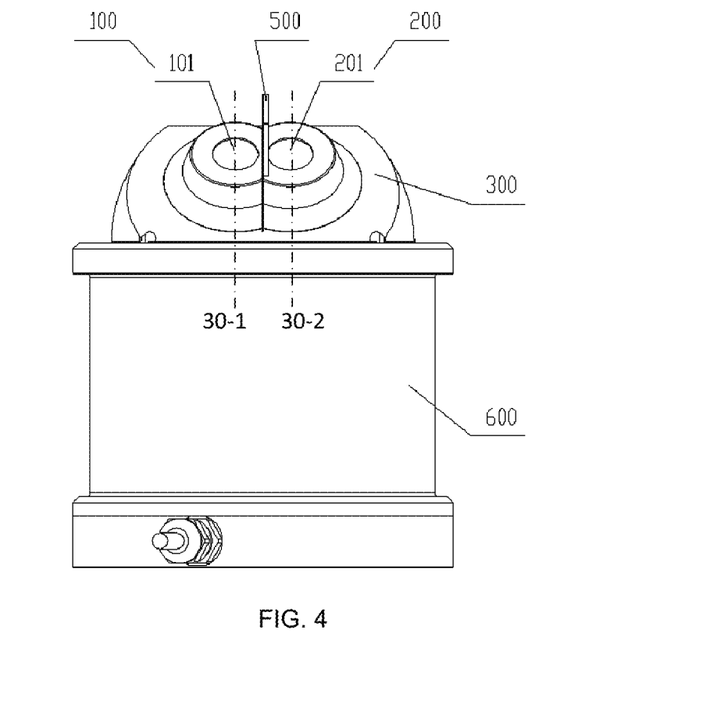
FIG. 4 is a front view of a Lidar device according to embodiment of the present disclosure.

As shown in FIGS. 3 and 4, according to some embodiments, the optical component of the Lidar device 10 may have one or more optical axes. For example, the one or more optical axes may include an optical axis of the transmitting system 100, which is a signal transmitting optical axis 30-1 as shown in FIG. 3. The one or more optical axes may also include an optical axis of the receiving system 200, which is a signal receiving optical axis 30-2. The one or more optical axes may also include any axis that is separated from and parallel to at least one of the signal transmitting optical axis 30-1 and the signal receiving optical axis 30-2.

The transmitting system 100 and the receiving system 200 may be disposed on the rotating component 300 in an oblique position with respect to the vertical shaft 400. Specifically, at least one of the signal transmitting and signal receiving optical axes 30-1 and 30-2 of the transmitting system 100 and the receiving system 200 may form an angle with the central axis of the vertical shaft 400, which is greater than 0° and smaller than 90°. As a result, the Lidar device 10 may have a greater field of view than conventional Lidar devices and may have the ability to detect objects in a greater detection region surrounding the Lidar device.

Figure 2:
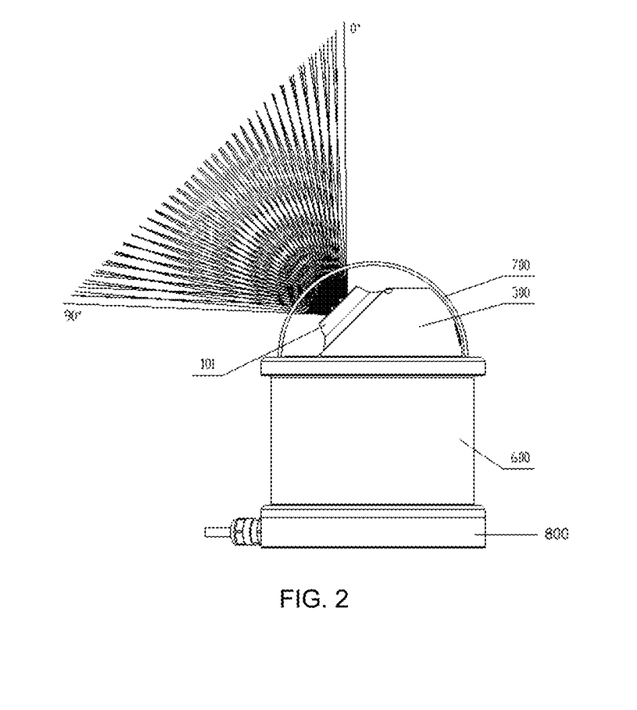
FIG. 2 is a lateral view of a Lidar device according to some embodiments of the present disclosure.

According to some embodiments, as shown in FIG. 2, the transmitting system 100 may have a field of view angle equal to or substantially equal to 90° from the vertical direction along the vertical shaft 400. The 90° field of view angle of the transmitting system 100 may provide a large detection region, thereby improving the detection capability of the Lidar device 10. The 90° field of view angle of the transmitting system 100 may be configured to cover any region along the vertical shaft 400. Of course, the transmitting system 100 and the receiving system 200 may each have a field of view angle smaller than 90° or greater than 90° according to some embodiments of the present application.

As further shown in FIG. 2, the field of view of the transmitting system 100 along the vertical shaft 400 may cover a range of 0°-90°, where 0° corresponds to a direction parallel to the central axis of the vertical shaft 400 and 90° corresponds to a direction perpendicular to the central axis of the vertical shaft 400. For example, as shown in FIG. 3, the one or more optical axes such as the signal transmitting optical axis 30-1 of the transmitting system 100 and the signal receiving optical axis 30-2 of the receiving system 200 may each form an angle of 45° with the central axis of the vertical shaft 400.

As another example, the one or more optical axes such as the signal transmitting optical axis 30-1 of the transmitting system 100 and the signal receiving optical axis 30-2 of the receiving system 200 may each form an angle $\beta$ less or greater than 45° with respect to the central axis of the vertical shaft 400. Accordingly, the field of view of the transmitting system 100 may be greater than 90° so that it still covers the 90° direction, which is along the central axis of the vertical shaft 400, and the 0° direction, which is perpendicular to the central axis of the vertical shaft 400. For example, when the angle $\beta$ between the one or more optical axes and the central axis of the vertical shaft 400 is less than 45°, the field of view may be set to $2 \times (90° - \beta)$. When the angle $\beta$ is greater than 45°, the field of view may be set to $2 \times \beta$.

As still another example, the optical component of the Lidar device 10 may have an optical axis that is separated from the signal transmitting optical axis 30-1 and the signal receiving optical axis 30-2 but parallel to at least one of the signal transmitting optical axis 30-1 or the signal receiving optical axis 30-2. The optical axis of the optical component of the Lidar device 10 may form an angle with the central axis of the vertical shaft 400. This angle may have a value between 0° and 180°. In a further example, the angle may be 45°.

Since the field of view covers 0°-90° around the vertical shaft 400 and, at the same time, the rotating component 300 drives the transmitting system 100 and the receiving system 200 to rotate around the vertical shaft 400, the Lidar device 10 may thus have a 180°×360° field of view, which may cover the entire upper hemisphere of the Lidar device 10. As a result, the field of view of the Lidar device 10 is significantly expanded from that of the conventional Lidar device. When installed or mounted on a base, such as an autonomous vehicle, the field of view may cover all directions in the entire hemisphere corresponding to the side of the vehicle where the Lidar device 10 is installed. The Lidar device 10 may detect not only objects in the direction perpendicular to the vertical shaft 400 but also objects above and around the vertical shaft 400 within the hemisphere described above. As another example, the outgoing light signal and the reflected light signal are symmetrically distributed around the vertical shaft 400 within the hemisphere of the Lidar device 10.

As shown in FIGS. 1, 3, and 4, the transmitting lens module 101 and the receiving lens module 201 are disposed side by side on the rotating component 300, aligned in the horizontal direction, and arranged symmetrical with respect to a plane that cuts the Lidar device 10 in halves.

Additionally, the transmitting lens module 101 and the receiving lens module 201 may be arranged as close to each other as the structures allows, so that most of the outgoing light signal that passes through the transmitting lens module 101 and gets reflected by the objects, i.e., the reflected light signal, may be received by the receiving lens module 201. The close proximity between the transmitting lens module 101 and the receiving lens module 201 may enable the receiving lens module 102 to receive a significant portion of the reflected light signal. A light blocking plate 500 may be further provided between the transmitting lens module 101 and the receiving lens module 102. The light blocking plate 500 may be used to prevent crosstalk between the outgoing light signal transmitted from the transmitting lens module 101 and the reflected light signal received by the receiving lens module 201.

Figure 5:
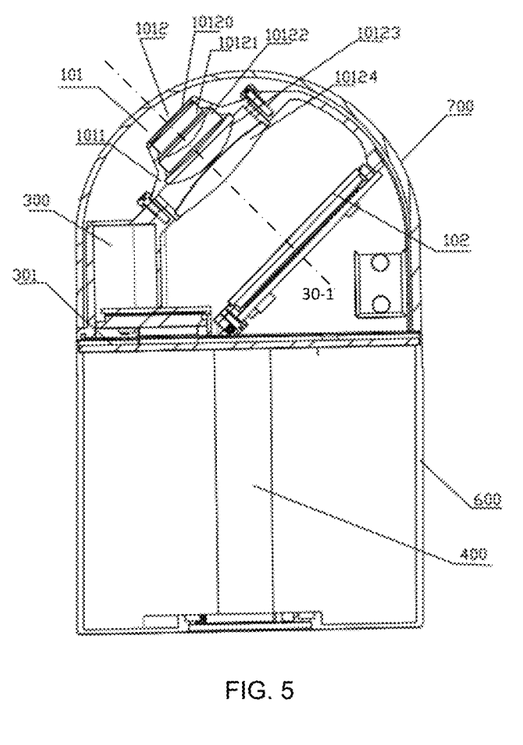
FIG. 5 is a lateral cross-sectional view of a Lidar device according to another embodiment of the present disclosure.

As shown in FIGS. 3 and 5, the transmitting lens module 101 may include a transmitting lens barrel 1011 and a transmitting lens group 1012. The transmitting lens group 1012 may be fixed in the transmitting lens barrel 1011. The receiving lens module 201 may include a receiving lens barrel (not shown in the figure) and a receiving lens group (not shown in the figure). The receiving lens group is fixed in the receiving lens barrel. The transmitting lens group 1012 is fixed to the rotating component 300 through the transmitting lens barrel 1011, and the receiving lens group is fixed to the rotating component 300 through the receiving lens barrel. In some exemplary embodiments, the transmitting lens group 1012 and the receiving lens group may be of the same or similar structure. For example, the transmitting lens group 1012 and the receiving lens group may be identical with each other.

The symmetrical structure formed by the transmitting system 100 and the receiving system 200 provides dynamic balance for the entire rotating component 300 and the various systems disposed thereon, thereby reducing wear and impact of the vertical shaft 400 during rotation and improving service life and reliability of the entire device.

As shown in FIG. 3, the transmitting device 102 may be disposed on the rotating component 300, and the outgoing light signal emitted by the transmitting device 102 may be aligned with the transmitting lens module 101 and may be transmitted outward through the transmitting lens module 101. As further shown in FIG. 7, the transmitting device 102 may include a transmitting substrate 1021 and a plurality of transmitters 1022 fixed on the transmitting substrate 1021. For example, the transmitting substrate 1021 may be a flat plate arranged in parallel with the vertical shaft 400. The transmitters 1022 may be arranged and disposed on the transmitting substrate 1021 along the vertical shaft 400 in an axial direction. Alternatively, as shown in FIG. 3, the transmitting substrate 1021 may have an arched surface, on which the transmitters 1022 are disposed. The transmitters 1022 may be disposed along the arched surface of the transmitting substrate 1021 so that the light rays emitted by the transmitters 1022 form the sectorial form. The sectorial form may be in a plane that is parallel to the vertical shaft 400 or passes through the vertical shaft 400. Accordingly, the fan-shaped distribution of light rays in the outgoing light signal provides a large field of view in comparison with the field of view of a single light ray. Further, the transmitting lens module 101 may include a collimating lens group, which is used to collimate the outgoing light signal to improve its directionality.

Further, as shown in FIGS. 2 and 3, the Lidar device 10 may further include a housing 600 and a cover 700. The housing 600 and the cover 700, when coupled together, formed a sealed cavity, in which the transmitting system 100, the receiving system 200, and the rotating component 300 may all be disposed. The sealed cavity may be waterproof, dustproof, and windproof, and thus provide a stable and reliable working environment for its internal components such as the transmitting system 100, the receiving system 200, and the rotating component 300.

According to some embodiments, the cover 700 may have a dome shape, as shown in FIGS. 2 and 3. The cover 700 may be a window made of materials that allow the outgoing light signal and the reflected light signal to pass through, while filtering out interfering light signals in the reflected light signal, thereby improving detection accuracy. The dome-shaped cover 700 is configured to pass through the outgoing light signal and the reflected light signal with minimum distortions. Further, the dome-shaped cover 700 does not interfere with the rotation of the internal components. The dome shape of the cover 700 may be substantially semi-spherical. In another example, the cover 700 may have a cylindrical shape, a cone shape, or any other shape that may be appreciated by one of ordinary skills in the art.

Figure 6:
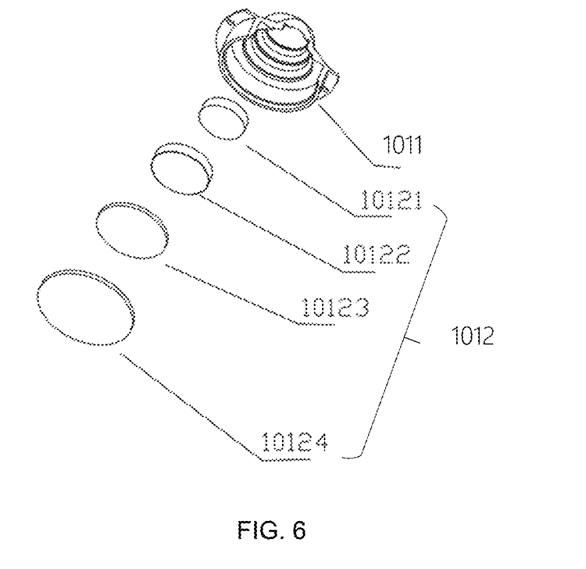
FIG. 6 is an exploded view of a transmitting lens group and a transmitting lens barrel according to some embodiments of the present disclosure.

According to some embodiments of the present application as shown in FIGS. 5 and 6, the transmitting system 100 may include a transmitting lens barrel 1011 and a transmitting lens group 1012 having a plurality of lenses disposed in the transmitting lens barrel 1011. The lenses of the lens group 1012 may be arranged in an order according to their diameters. Specifically, the lens having the smallest diameter may be disposed at the top end of the transmitting lens barrel 1011, and the lens having the largest diameter may be disposed at the bottom end of the transmitting lens barrel 1011. Other lenses, if any, may be arranged from the top end to the bottom end of the transmitting lens barrel 1011 so that each lens has a diameter greater than that of the previous lens in the lens group 1012.

The transmitting system 21 may be configured to transmit the outgoing light signal emitted by the transmitting device 102. Specifically, the outgoing light signal may be received from the transmitting device 102 by the transmitting lens group 1012 through the lens with the largest diameter, and transmitted to the detection region through the lens with the smallest diameter. The transmitting lens barrel 1011 may be configured to receive and fix the transmitting lens group 1012. The signal transmitting optical axis 30-1 of the transmitting system 100 may form an angle with the central axis of vertical shaft 400 as discussed above. The angle may be of a range of 0°-90°. For example, the angle is equal to 45° with respect to the central axis of the vertical shaft 400.

According to some embodiments, the aperture of the light emitting end (i.e., the top end) of the transmitting lens barrel 1011 may be smaller than the aperture of the light incident end (i.e., the bottom end). The transmitting lens group 1012 may have four lenses 10121, 1022, 1023, 10124, which may be coaxially arranged in the transmitting lens barrel 1011 in the order described above. The light transmitting system 100 may receive the outgoing light signal from the light transmitting device 102 through the lens 10124 having the largest diameter and outputs the outgoing light signal through the lens 10121 having the smallest diameter.

A light transmitter array, such as the array 1022 shown in FIG. 3, may be arranged on the light transmitting device 102 and correspond to the lens 10124 having the largest diameter. Additionally, in order to further improve performance of the outgoing light signal, a diaphragm may be disposed between the lens 10121 having the smallest diameter and the lens 10122 having the second smallest diameter of the transmitting lens group 1012 to filter stray light. The diaphragm may be a standalone component or may be integrated with one of the lenses to reduce the size of the structure. By receiving the outgoing light signal through the lens 10124 having the largest diameter, and gradually reducing the aperture as the outgoing light signal travels through the transmitting lens group 1012, the transmitting system 100 provides a compact design that may be easily disposed within the dome-shaped cover 700, without sacrificing the optical performance of the system.

FIG. 6 is an exploded view of the transmitting lens module of the transmitting system 100, according to some embodiments. As shown in FIG. 6, the lenses 10121-10124 of the transmitting lens group 1012 are coaxially disposed inside the transmitting lens barrel 1011. The interior surface of the lens barrel 1011 is configured with slots and/or steps corresponding to the lenses. The slots and/or steps are configured to hold or fix the lenses 10121-10124 within the transmitting lens barrel 1011. Glue, snap connections, or other fastening means may be used to further secure the lenses 10121-10124 within the transmitting lens barrel 1011.

Figure 7:
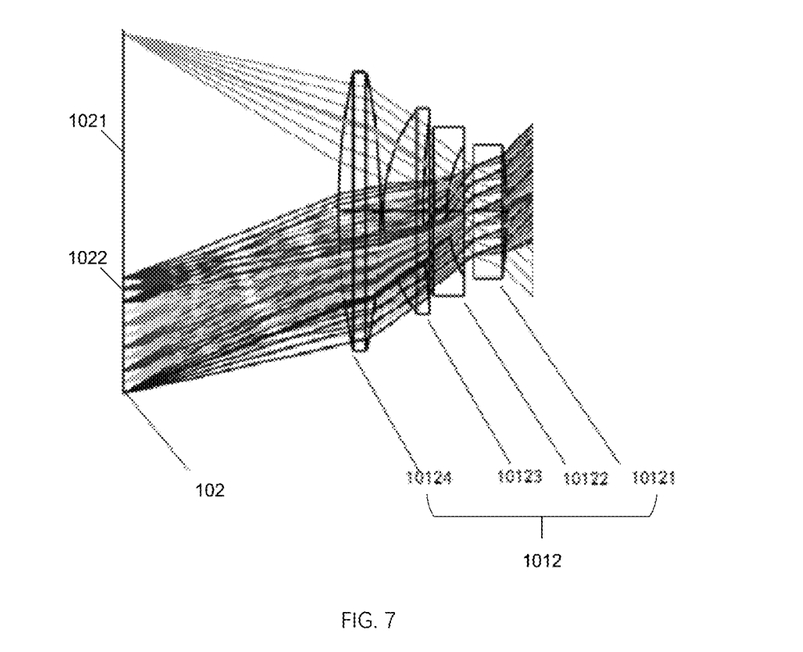
FIG. 7 is lateral view of a transmitting lens group according to some embodiments of the present disclosure.

According to some embodiments, the overall diopter (i.e., the optical power) of the light transmitting system 100 may be positive. The light transmitting system 100 is an equivalent of a telecentric system toward the top end, i.e., the end of the small aperture. On the other hand, the light transmitting system 100 is an equivalent of an afocal system toward the bottom end, i.e., the end of the large aperture. As shown in FIG. 7 the outgoing light signal is transmitted from the lens 10124 having the largest diameter to the lens 10121 having the smallest diameter.

According to some embodiments, the light transmitting system 100 may use spherical lenses for the lenses 10121-10124. In one embodiment, as shown in FIG. 7, the lenses 10121 having the smallest diameter, the lens 10123 having the second largest diameter, and the lens 10124 having the largest diameter each have a positive diopter, the lens 10122 having the second smallest diameter has a negative diopter. The lens 10123 having the second largest diameter and the lens 10124 having the largest diameter may be high-refractive-index lenses. For example, the refractive indices of these two lenses may be between 1.9 and 2.2.

In order to further reduce the size of each lens in the light transmitting system 100, the thickness and curvature of each lens may be adjusted. For example, by adjusting the materials of the lens 10123 having the second largest diameter and the lens 10124 having the largest diameter, the refractive indices of these lenses may be set between 1.8 and 1.9. As a result, the total length of the light transmitting system 100 may be greatly reduced. For example, the total length of the transmitting lens module of the transmitting system 21 may be reduced by about 8 mm compared with the previous example.

Alternatively, different lens configurations may also be applied to the light transmitting system 100 as follows:
  a) The lens 10121 having the smallest diameter and the lens 10124 having the largest diameter may each have a positive diopter, and the lens 10122 having the second smallest diameter and the lens 10123 having the second largest diameter may each have a negative diopter.
  b) The lens 10121 having the smallest diameter and the lens 10123 having the second largest diameter may each have a positive diopter, and the lens 10122 having the second smallest diameter and the lens 10124 having the largest diameter may each have a negative diopter.
  c) The lens 10121 having the smallest diameter and the lens 10123 having the second largest diameter may each have a negative diopter, and the lens 10122 having the second smallest diameter and the lens 10124 having the largest diameter may each have a positive diopter.
  d) The lens 10121 having the smallest diameter and the lens 10124 having the largest diameter may each have a negative diopter, and the lens 10122 having the second smallest diameter and the lens 10124 having the second largest diameter may each have a positive diopter.

Of course, the light transmitting system 100 may also use aspherical lenses, such as cylindrical lenses. By combining two or more lenses, the same optical performance may be achieved.

Figure 8:
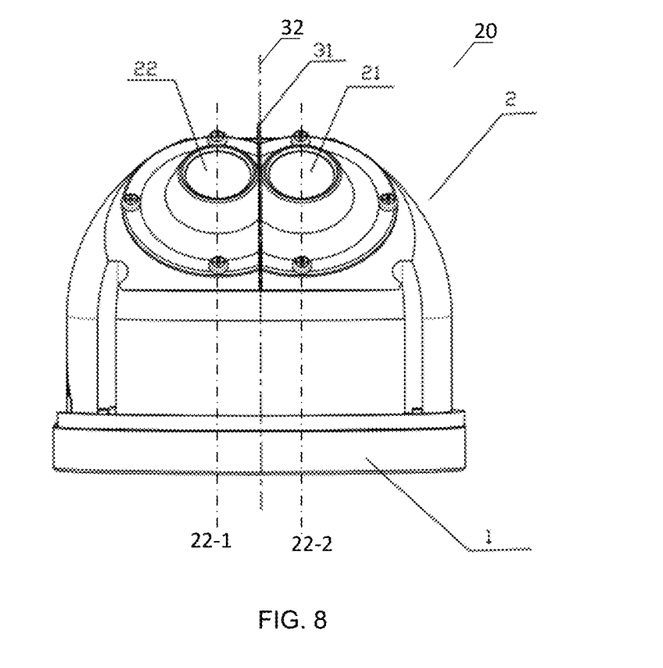
FIG. 8 is a front view of a Lidar device according to another embodiment of the present disclosure.

FIG. 8 shows a Lidar device 20 according to another embodiment of the present application. The Lidar device 20 may include a base 1 and a rotating body 2. The rotating body 2 is disposed on the base 1 and may be rotated with respect to the base 1. The rotating body 2 may include an optical component having a transmitting system 21 and a receiving system 22 disposed thereon. In order to provide a vertical field of view for scanning and data acquisition, the transmitting system 21 and the receiving system 22 are arranged side by side and aligned horizontally with respect to a central axis 32 of the rotating body 2.

Figure 9:
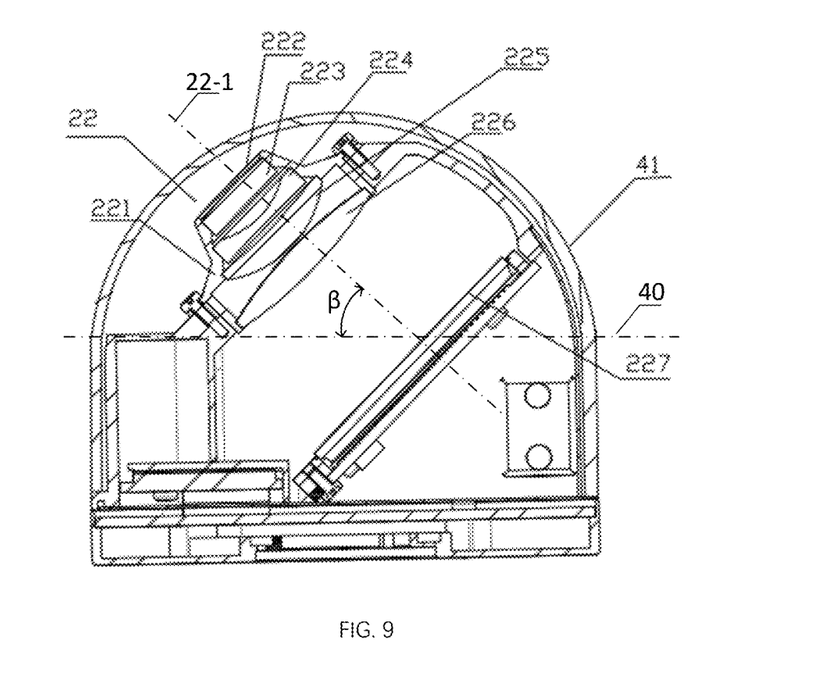
FIG. 9 is a lateral cross-sectional view of a Lidar device according to another embodiment of the disclosure.

As further shown in FIGS. 8 and 9, the optical component may have one or more optical axes. For example, the one or more optical axes may include an optical axis of the transmitting system 21, which is a transmitting optical axis 21-1 as shown in FIG. 8. The one or more optical axes may also include an optical axis of the receiving system 22, which is a receiving optical axis 22-1 as shown in FIG. 8. The one or more optical axes may also include any axis that is parallel to the transmitting optical axis 21-1 and/or the receiving optical axis 22-1.

The transmitting system 21 and the receiving system 22 are arranged in an oblique position with respect to the central axis 32, such that at least one of the optical axes, such as the transmitting and receiving optical axes 21-1 and 22-1 forms an angle β with a horizontal axis 40. For example, the angle β may be equal to 45°. Alternatively, the angle β may be any acute angle between 0° and 90°. Still alternatively, the angle β may be any obtuse angle. Accordingly, the transmitting system 21 and the receiving system 22 may be configured to conduct scanning in the vertical direction while being rotated with respect to the base 1. Compared with conventional Lidar devices, the Lidar device 20 has a larger field of view in the vertical direction.

As still another example, the optical component may have an optical axis that is separated from the transmitting optical axis 21-1 and the receiving optical axis 22-1 but parallel to at least one of the transmitting optical axis 21-1 or the receiving optical axis 22-1. The optical axis of the optical component may form an angle β with the horizontal axis 40. This angle β may have a value between 0° and 180°. In a further example, the angle may be 45°.

According to some embodiments, in order to prevent crosstalk between the outgoing light signal and the reflected light signal, a spacer 31 is provided between the transmitting system 21 and the receiving system 22. For example, the spacer 31 may be disposed between the transmitting system 21 and the receiving system 22 and along a center line of the rotating body 2. Thus, the transmitting system 21 and the receiving system 22 may be symmetrical arranged on two sides on the spacer 31. Additionally, the spacer 31 may divide the rotating body into two symmetrical parts.

According to still another embodiment, in order to protect the internal structures, such as the transmitting system 21 and the receiving system 22, from environmental factors, i.e., water, wind, humidity, dust, etc., a transparent cover 41 is disposed on the rotating body 2 and may be rotated with the rotating body 2. The transparent cover 41 and the rotating body 2 are coupled to form a sealed cavity, in which the transmitting system 21 and the receiving system 22 are disposed. Further, the rotating body 2 has a cylindrical shape and the transparent cover 41 has a dome shape. The rotating body 2 and the transparent cover 41 may be rotated with respect to the base 1 during scanning.

The cylindrical shape of the rotating body 2 and the dome shape of the transparent cover 41 allow the Lidar device 20 to have a compact structure, which may limit the size of the transmitting system 21 and the receiving system 22 disposed therein. As a result, the lens systems of the transmitting system 21 and the receiving system 22 may be restricted. Hence, embodiments of the present application further provide a new design for the transmitting system 21 and the receiving system 21 of the Lidar device 20 that allows the transmitting system 21 and the receiving system 21 to each have a compact structure while improving the optical performance of the Lidar device 20.

As further shown in FIGS. 8 and 9, the transmitting system 21 and the receiving system 22 each have a cone or pyramid structure. Specifically, for the transmitting system 21, the aperture of the light emitting end is smaller than the aperture of the light incident end, whereas, for the receiving system 22, the aperture of the light incident end is smaller than the aperture of the light emitting end.

Similar to the transmitting system 100 of FIGS. 1-7, the transmitting system 21 may include a transmitting lens module, which may include a transmitting lens barrel and a transmitting lens group having a plurality of lenses disposed in the transmitting lens barrel. These lenses are arranged in an order according to their diameters. That is, from the top to the bottom of the transmitting system 21, the diameter of each lens within the transmitting lens group is greater than that of the previous lens within the lens group. As a result, the transmitting system 21 is configured to receive the outgoing light signal emitted by the light emission plate through the lens having the largest diameter, and transmit the outgoing light signal through the lens having the smallest diameter to the detection region.

Similarly, the receiving system 22 may include a receiving lens module, which may include a receiving lens barrel 221 and a receiving lens group having a plurality of lenses disposed in the receiving lens barrel 221. These lenses are also arranged in an order according to their diameters. That is, from the top to the bottom of the receiving system 22, the diameter of each lens within the receiving lens group is greater than that of the previous lens within the receiving lens group. As a result, the receiving system 22 is configured to receive the reflected light signal through the lens with the smallest diameter, and output the received reflected light signal from the lens with the largest diameter to a light receiving plate. Compared with a cylindrical design, the cone or pyramid structures of the transmitting system 21 and the receiving system 22 each having a large aperture at the bottom end and a small aperture at the top end. Such a design may allow a more compact size of the transparent cover 41, while reducing the distance between the light emission plate and light receiving board to the transmitting system 21 and the receiving system 22, respectively, thereby improving the performance of the Lidar device 20.

FIG. 9 is a cross-sectional view of the receiving system 22 according to some embodiments of the present application. The receiving system 22 may be disposed in the rotating body 2 and include a receiving lens module and a light receiving plate 227. As shown in FIG. 9, the receiving lens module may include a receiving lens barrel 221 and a receiving lens group disposed in the receiving lens barrel 221. The receiving lens group may include a plurality of lenses. For example, the receiving lens group may include lenses 223-226 disposed inside the receiving lens barrel 221. The lenses 223-226 are coaxially arranged and are configured to modify the reflected light signal.

Figure 10:
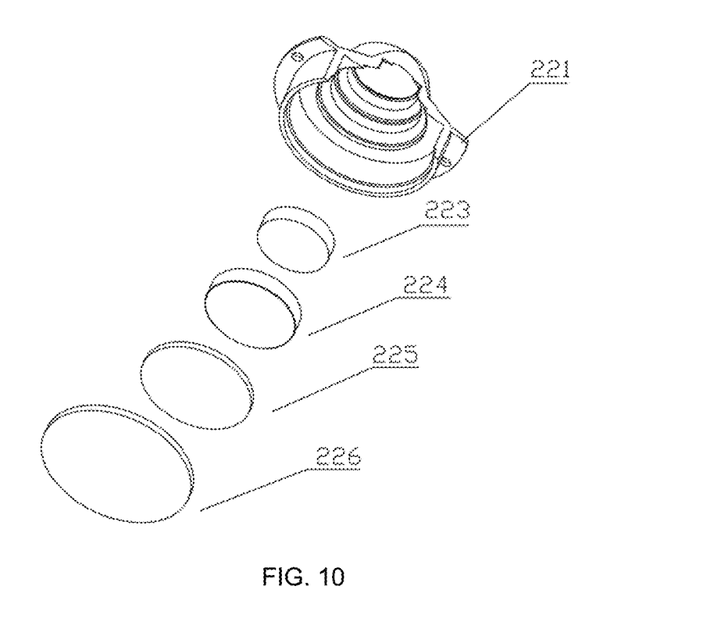
FIG. 10 is an exploded view of a receiving lens group and a receiving lens barrel according to some embodiments of the present disclosure.

Further, the lenses 223-226 may be arranged in that order from the top end of the receiving lens barrel 221 to the bottom end of the receiving lens barrel 221, as shown in FIGS. 9 and 10. The lens 223 has the smallest diameter, whereas the lens 226 has the largest diameter. Each of the lens 224 and the lens 225 has a diameter greater than that of the previous lens in the lens group. That is, the lens 224 has a diameter greater than that of the lens 113 and smaller than that of the lens 225; the lens 225 has a diameter greater than that of the lens 224 and smaller than that of the lens 226. The number of lenses in the receiving system 22 may be greater or smaller than four.

After the reflected light signal is adjusted by the receiving lens group including the lenses 223-226, the adjusted reflected light signal is directed to the light receiving plate 227. The light receiving plate 227 may include a light receiver array, which is configured to achieve a desired laser receiving effect. The lens 226 is aligned with and faces the laser receiving plate 227.

According to some embodiments, in order to achieve a better receiving effect, a filter 222 may be disposed on a side of the lens 223 away from the lens 224 for filtering the incoming reflected light signal before the reflected light signal is received by the lens 223. Further, in order to better filter the reflected light signal, a diaphragm may be disposed between the lens 223 and the lens 224 to filter out stray light. The diaphragm may be a standalone component. Alternatively, it may be integrated with the lens 223 and/or the lens 224 to achieve a more compact design. Compared with conventional designs, the structures and designs disclosed herein allow the light receiving plate 227 to retain a large light receiving surface, while reducing the size of the receiving system 22. Thus, the Lidar device 20 may have a compact design without sacrificing the performance.

FIG. 10 is an exploded view of the receiving lens module of the receiving system 22, according to some embodiments. As shown in FIG. 10, the lenses 223-226 are coaxially disposed inside the receiving lens barrel 221. The interior surface of the lens barrel 221 is configured with slots and/or steps corresponding to the lenses. The slots and/or steps are configured to hold or fix the lenses within the receiving lens barrel 221. Glue, snap connections, or other fastening means may be used to further secure the lenses within the lens barrel 221.

The light receiving system 22 disclosed herein, including the lenses 223-226, may have a positive overall diopter (i.e., the optical power of the system). Specifically, the light receiving system 22 is an equivalent of a telecentric system toward the top end, i.e., the end of the small aperture close to the lens 223. On the other hand, the light receiving system 22 is an equivalent of an afocal system toward the bottom end, i.e., the end of the large aperture close the lens 226. As further shown in FIG. 11, the reflected light signal received by the light receiving system 22 is transmitted to the light receiving plate 227 through the lenses 223-226. The lenses 223-226 of the receiving system 22 may be spherical lenses.

Figure 11:
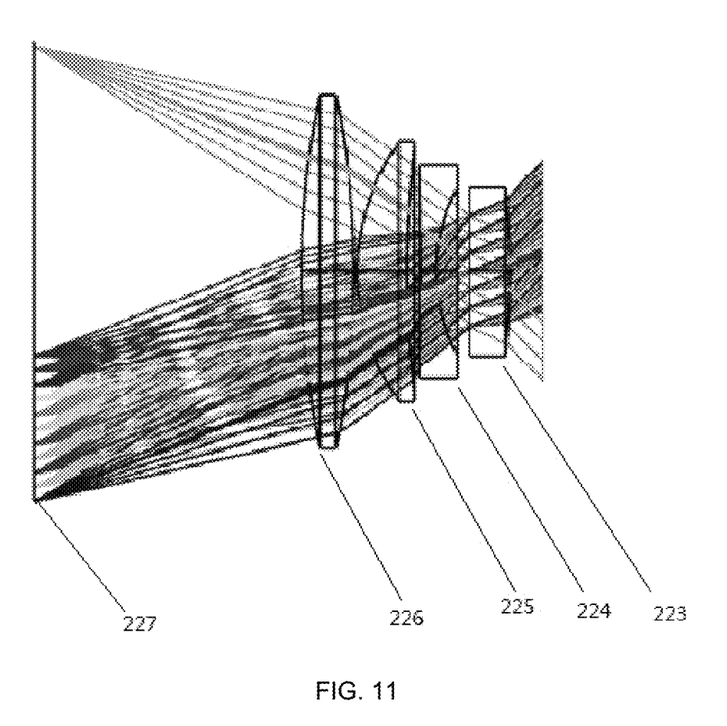
FIG. 11 is a lateral view of a receiving lens group according to some embodiments of the present disclosure.

In some embodiments, the lenses 223, 225, and 226 may each have a positive diopter, while the lens 224 has a negative diopter. In addition, the lens 225 and the lens 226 are high-refractive-index lenses. For example, the refractive indices of the lens 225 and the lens 226 may be between 1.9 and 2.2 in order to maximize the irradiation area of the light receiving plate 227, on which the reflected light signal may be directed, so as to achieve a better reception.

In order to further reduce the size of each lens in the receiving system 22, the thickness and curvature of each lens can be adjusted. The refractive indices of the lens 225 and the lens 226 may be set between 1.8 and 1.9 by adjusting the materials of the lenses. For example, the total length (i.e., the distance between the top end and the bottom end) of the receiving lens module of the receiving system 22 may be greatly reduced. For example, the length of the receiving lens module of the receiving system may be reduced by about 8 mm compared with the previous example.

Alternatively, in order to achieve the desired receiving effect of the above-mentioned light receiving system 22, the receiving lens group may also utilize other configurations. For example, one of the following lens configurations may be used for the receiving system 22:
  a) The lens 223 and the lens 226 may each have a positive diopter, and the lens 224 and the lens 225 may each have a negative diopter.
  b) The lens 223 and the lens 225 may each have a positive diopter, and the lens 224 and the lens 226 may each have a negative diopter.
  c) The lens 223 and the lens 225 may each have a negative diopter, and the lens 224 and the lens 226 may each have a positive diopter.
  d) The lens 223 and fourth lens 226 may each have a negative diopter, and the lens 224 and the lens 225 may each have a positive diopter.

Still alternatively, the above-mentioned light receiving system 22 may also use lenses other than spherical lenses described above, such as cylindrical lenses. By combining two or more lenses, the same receiving effect may be achieved.

The technical features of the embodiments described above may be combined in many different ways. In order to make the description concise, not every possible combination of the technical features in the above embodiments has been described herein. However, as long as there is no contradiction in the combination of these technical features, such a combination should be considered as within the scope disclosed in this specification. It should be noted that "in an embodiment," "for example," "another example," and the like in the present application are intended to illustrate the present application instead of limiting the present application.

The aforementioned embodiments are merely a few embodiments of the present application. Their descriptions are specific and detailed, but should not be understood as the limitations on the scope of the present application. It is appreciated by a person of ordinary skill in the art that many variations and improvements may be made without departing from the concept of the present application, and these variations and improvements all fall within the scope of protection of the present application. Therefore, the scope of protection of the present application shall be defined by the appended claims.

The invention claimed is:

1. A Lidar device, comprising:
 a rotating component rotatably mounted to a base and configured to rotate about a central shaft; and
 an optical component mounted on the rotating component, the optical component having an optical axis that is oblique with respect to the central shaft,
 wherein the optical component comprises:
  a transmitting system, comprising a transmitting barrel and a transmitting lens group, and configured to generate and transmit an outgoing light signal to a detection region; and
  a receiving system, comprising a receiving barrel and a receiving lens group structurally similar to the transmitting lens group, and configured to receive a reflected light signal from the detection region, the reflected light signal comprising a portion of the outgoing light signal reflected from the detection region,
 wherein each pair of the barrel and the lens group comprises:
  a first aperture at a first end of the barrel, and
  a second aperture bigger than the first aperture at a second end of the barrel, and
 wherein each of the lens groups is disposed in the corresponding barrel and comprises:
  a first lens disposed at the first end of the barrel, having a first diameter; and
  a second lens disposed at the second end of the barrel, having a second diameter smaller than the first diameter.

2. The Lidar device of claim 1, wherein the optical axis and the central shaft form an acute angle.

3. The Lidar device of claim 2, wherein the optical axis and the central shaft form a substantially 45° angle.

4. The Lidar device of claim 2, wherein a field of view of the Lidar device is substantially 90°.

5. The Lidar device of claim 4, wherein the field of view of the Lidar device covers between a direction along the central shaft and a direction perpendicular to the central shaft.

6. The Lidar device of claim 1, further comprising a housing and a cover coupled to form a seal cavity for housing the rotating component and the optical component.

7. The Lidar device of claim 6, wherein the cover has a dome shape.

8. The Lidar device of claim 1, wherein each of the lens groups further comprises a third lens having a third diameter and disposed in the barrel between the first end and the second end, and
 wherein the third diameter is greater than the first diameter of the first lens and smaller than the second diameter of the second lens.

9. The Lidar device of claim 8, wherein each of the lens groups further comprises a fourth lens having a fourth diameter and disposed in the lens barrel between the third lens and the second lens, wherein the fourth diameter is greater than the third diameter of the third lens and smaller than the second diameter of the second lens.

10. The Lidar device of claim 9, wherein each of the second lens and the fourth lens has a refractive index between 1.8 and 2.2.

11. The Lidar device of claim 9, wherein the first lens has a first diopter, the second lens has a second diopter, the third lens has a third diopter, and the fourth lens has a fourth diopter, and wherein the first, second, third, and fourth diopters are configured according to one of the followings:
 the first, second, and fourth diopters are positive, and the third diopter is negative;
 the first and second diopters are positive, and the third and fourth diopters are negative;
 the first and fourth diopters are positive, and the second and third diopters are negative;
 the first and fourth diopters are negative, and the second and third diopters are positive; or
 the first and second diopters are negative, and the third and fourth diopters are positive.

12. The Lidar device according to claim 1, wherein
 the rotating component has a first side and a second side opposite to the first side;
 the optical component is mounted to the first side of the rotating component; and
 the central shaft is coupled to the second side of the rotating component and configured to drive the rotating component to rotate.

13. The Lidar device of claim 12, wherein the optical component comprises:
 a transmitting system disposed on the rotating component to generate and transmit an outgoing light signal to a detection region, and
 a receiving system disposed on the rotating component to receive a reflected light signal from the detection region, the reflected light signal comprising a portion of the outgoing light signal reflected from the detection region, wherein:
  the rotating component is coupled to a base through the central shaft, and configured to drive the transmitting system and the receiving system to rotate; and
  the transmitting system has a transmitting axis and the receiving system has a receiving axis, and the optical axis of the optical component are parallel to the transmitting axis and the receiving axis.

14. The Lidar device of claim 13, wherein the transmitting axis forms an angle β substantially equal to 45° with respect to the central shaft; and
 wherein a field of view of the transmitting system is substantially equal to 90° to cover between a direction along a central axis of the central shaft and a direction perpendicular to the central axis of a vertical shaft.

15. The Lidar device of claim 13, wherein the transmitting axis forms an angle β less than 45° with respect to the central shaft; and wherein a field of view of the transmitting system is greater than 90° to cover between a direction along a central axis of the central shaft and a direction perpendicular to the central axis of a vertical shaft.

16. The Lidar device of claim 13, wherein the transmitting axis forms an angle β greater than 45° with respect to the central shaft; and wherein a field of view of the transmitting system is greater than 90° to cover between a direction along a central axis of the central shaft and a direction perpendicular to the central axis of a vertical shaft.

* * * * *